United States Patent
Cree et al.

(10) Patent No.: US 11,207,816 B2
(45) Date of Patent: *Dec. 28, 2021

(54) HIGH PERFORMANCE COOLING ELEMENT

(71) Applicant: Addex, Inc., Newark, NY (US)

(72) Inventors: Robert E. Cree, Newark, NY (US); William J. Randolph, Farmington, NY (US)

(73) Assignee: Addex, Inc., Newark, NY (US)

(*) Notice: Subject to any disclaimer, the term of this patent is extended or adjusted under 35 U.S.C. 154(b) by 265 days.

This patent is subject to a terminal disclaimer.

(21) Appl. No.: 16/422,219

(22) Filed: May 24, 2019

(65) Prior Publication Data
US 2019/0275724 A1   Sep. 12, 2019

Related U.S. Application Data

(63) Continuation of application No. 15/235,868, filed on Aug. 12, 2016, now Pat. No. 10,357,914, which is a (Continued)

(51) Int. Cl.
*B29C 49/00* (2006.01)
*B29C 48/10* (2019.01)
(Continued)

(52) U.S. Cl.
CPC .......... *B29C 49/0015* (2013.01); *B29C 48/10* (2019.02); *B29C 48/913* (2019.02);
(Continued)

(58) Field of Classification Search
None
See application file for complete search history.

(56) References Cited

U.S. PATENT DOCUMENTS

| 3,210,803 A | 10/1965 | Najar |
| 3,507,006 A | 4/1970 | Princen |

(Continued)

FOREIGN PATENT DOCUMENTS

| CA | 3009083 C | 6/2021 |
| EP | 0043271 A1 | 1/1982 |

(Continued)

OTHER PUBLICATIONS

Canadian Patent Office, Office Action in corresponding CA Application No. 3009079, dated May 30, 2019.
(Continued)

*Primary Examiner* — Monica A Huson
(74) *Attorney, Agent, or Firm* — Timothy W. Menasco, Esq.; Harter Secrest & Emery LLP

(57) ABSTRACT

The present invention relates to an external cooling system for a molten film tube produced by a blown film tubular extrusion process. Embodiments of the present disclosure provide a unidirectional cooling element having a unidirectional cooling interface containing a cooling gas deflector spaced adjacent to the molten film tube. The unidirectional cooling element operably expels cooling gas in a path with the flow of the molten film tube toward an exit gap formed between the unidirectional cooling interface and the molten film tube. The minimum gap between the unidirectional cooling interface and the molten film tube occurs at the exit gap, and advantageously, the unidirectional cooling interface is provided with one or more compound angles to maximize stability and cooling efficiency.

19 Claims, 9 Drawing Sheets

Related U.S. Application Data continuation-in-part of application No. 14/997,157, filed on Jan. 15, 2016, now Pat. No. 10,391,696.

(51) Int. Cl.
*B29C 48/88* (2019.01)
*B29K 101/12* (2006.01)
*B29C 48/92* (2019.01)
*B29L 23/00* (2006.01)
*B29C 48/00* (2019.01)

(52) U.S. Cl.
CPC .......... *B29C 48/0018* (2019.02); *B29C 48/92* (2019.02); *B29C 2948/926* (2019.02); *B29K 2101/12* (2013.01); *B29L 2023/001* (2013.01)

(56) References Cited

U.S. PATENT DOCUMENTS

| | | | |
|---|---|---|---|
| 3,568,252 A | 3/1971 | Masuda et al. | |
| 3,754,067 A | 8/1973 | Saint Eve et al. | |
| 3,835,209 A | 9/1974 | Karabedian | |
| 3,867,083 A | 2/1975 | Herrington | |
| 3,888,609 A | 6/1975 | Saint Eve et al. | |
| 3,959,425 A | 5/1976 | Herrington | |
| 3,976,732 A | 8/1976 | Herrington | |
| 4,022,558 A | 5/1977 | Herrington | |
| 4,118,453 A | 10/1978 | Herrington | |
| 4,145,177 A | 3/1979 | Schott | |
| 4,174,932 A * | 11/1979 | Herrington | B29C 48/10 425/72.1 |
| 4,259,047 A | 3/1981 | Cole | |
| 4,272,231 A | 6/1981 | Schott | |
| 4,330,501 A * | 5/1982 | Jones | B29C 48/913 264/566 |
| 4,447,387 A | 5/1984 | Blakeslee, III et al. | |
| 4,472,343 A | 9/1984 | Kawamura et al. | |
| 4,479,766 A | 10/1984 | Planeta | |
| 4,601,649 A | 7/1986 | Upmeier | |
| 4,606,879 A | 8/1986 | Cerisano | |
| 4,632,801 A | 12/1986 | Dowd | |
| 4,728,277 A | 3/1988 | Planeta | |
| 4,749,346 A | 6/1988 | Planeta | |
| 4,826,414 A | 5/1989 | Planeta | |
| 4,842,803 A | 6/1989 | Bose et al. | |
| 4,929,162 A | 5/1990 | Planeta | |
| 6,273,699 B1 | 8/2001 | Finke | |
| 8,956,136 B2 | 2/2015 | Zimmermann | |
| 10,357,914 B2 * | 7/2019 | Cree | B29C 48/10 |
| 2006/0099291 A1 | 5/2006 | Planeta et al. | |
| 2007/0098834 A1 | 5/2007 | Mirek et al. | |
| 2008/0258325 A1 | 10/2008 | Zimmermann | |
| 2019/0143573 A1 | 5/2019 | Backmann et al. | |
| 2019/0291337 A1 | 9/2019 | Mandzsu et al. | |

FOREIGN PATENT DOCUMENTS

| | | |
|---|---|---|
| FR | 2517248 A1 | 6/1983 |
| WO | 2015/172226 A1 | 11/2015 |

OTHER PUBLICATIONS

Canadian Patent Office, Office Action in corresponding CA Application No. 3009079, dated Feb. 24, 2020.
European Patent Office, Extended European Search Report in corresponding EP Application No. 17739101.8, dated Jun. 25, 2019.
European Patent Office, Office Action in corresponding EP Application No. 17739101.8, dated May 26, 2021.
Japanese Patent Office, Office Action in corresponding JP Application No. 201780007440.1, dated Jan. 19, 2020.

* cited by examiner

502: receiving, by at least one divergent cooling element, a flow of a molten film tube; and cooling, by the at least one divergent cooling element, the flow of the molten film tube, wherein the at least one divergent cooling element comprises a divergent cooling interface operable for expelling a cooling gas (i) in a path opposing the flow of the molten film tube toward a first exit gap and (ii) in a path with the flow of the molten film tube toward a second exit gap, wherein at least one of the first exit gap and the second exit gap define a minimum gap between the divergent cooling interface and the flow of the molten film tube.

504: wherein the at least one divergent cooling interface comprises a cooling gas deflector for directing expelled cooling gas along the path opposing the flow of the molten film tube and along the path with the flow of the molten film tube.

506: further comprising cooling by a second cooling element stacked adjacent the at least one divergent cooling element.

508: further comprising cooling the flow of the molten film tube by at least one of a triple flow air ring and a multiple flow air ring.

510: wherein a space is defined between the at least one divergent cooling element and the second cooling element to allow gas exchange with a surrounding atmosphere.

512: wherein a portion of the divergent cooling interface expelling the cooling gas in the path opposing the flow of the molten film tube forms compound angles, and wherein a portion of the divergent cooling interface expelling the cooling gas in the path with the flow of the molten film forms compound angles.

514: wherein the expelled cooling gas from the at least one divergent cooling element sufficiently cools the molten film tube at a rate between 0.5 and 5 (pounds/hour)/(inch of die circumference).

516: wherein at least a portion of the cooling gas is received by at least one enclosure comprising a cavity for receiving the cooling gas from the at least one divergent cooling element, the at least one enclosure operable to maintain a predetermined pressure differential between an inside surface and an outside surface of the flow of the molten film tube.

FIG. 5

802: (a) receiving, by a unidirectional cooling element, a flow of a molten film tube; and (b) cooling, by the unidirectional cooling element, the flow of molten film tube, wherein the unidirectional cooling element comprises a unidirectional cooling interface operable for expelling a cooling gas in a path with the flow of the molten film tube toward an exit gap, wherein the exit gap defines a minimum gap with expelled cooling gas flowing between the unidirectional cooling interface and the blow of the molten film tube.

804: wherein the unidirectional cooling interface comprises a cooling gas deflector for directing expelled cooling gas along the path with the flow of the molten film tube.

806: the method further comprising cooling by a second cooling element stacked adjacent the unidirectional cooling element.

808: the method further comprising cooling the flow of the molten film tube by at least one of a single flow air ring, a dual flow air ring, a triple flow air ring, and a multiple flow air ring.

810: the method further comprising cooling the flow of the molten film tube by the second cooling element comprising a single flow air foil having a cooling interface operable to expel cooling gas in the path with the flow of the molten film tube, and receive expelled cooling gas from the unidirectional cooling element along the cooling interface.

812: wherein the single flow air flow foil is a dual flow air foil with a first annular gap removed.

814: wherein a portion of the unidirectional cooling interface expelling the cooling gas in the path with the flow of the molten film form compound angles.

816: wherein the expelled cooling gas from the unidirectional cooling element sufficiently cools the molten film tube at a rate between 0.5 and 5 (pounds/hour)/(inch of die circumference).

818: wherein the unidirectional cooling element is operable to expel cooling gas at a rate of between 2,000 to 20,000 feet/minute

FIG. 8

HIGH PERFORMANCE COOLING ELEMENT

BACKGROUND OF THE INVENTION

Field of the Invention

The present disclosure relates to a method and apparatus for cooling. The present disclosure relates more particularly to a method and apparatus for high performance cooling.

Description of Related Art

Various methods to manufacture thermoplastic blown films are well known in the plastics art, and typically involve forming a continuous, vertically oriented, seamless, annular plastic film commonly referred to as the "tube" or "bubble". Thermoplastic material is melted and pumped by an extruder through a blown film die (die), exiting as an annular flow of a molten film, continuously drawn upward by a pair of driven squeeze rollers. Gas is typically manually injected through the die to the interior of the exiting annular flow of molten film. The driven squeeze rollers act to prevent gas from escaping, trapping the injected gas inside, forming a molten film tube which is inflated by the injected gas until at the desired size and the die is sealed off to prevent inflation gas from escaping. The molten film tube is pulled upward by the driven squeeze rollers, flowing generally upward from the die through a cooling system, where it stretches, expands, and cools around the now trapped column of injected gas until it solidifies at a frost line into a solidified film tube. The solidified film tube passes through various stabilizers and enters a flattening device, which converts the tube into a flattened double thickness thermoplastic sheet of film known as "lay-flat". The lay-flat passes through the driven squeeze rollers, and is conveyed to downstream converting equipment such as winders and bag making machines for further processing.

To remain competitive, manufacturers of blown film must maximize throughput rate and quality, however cooling system performance is a significant limiting factor. The weight of thermoplastic that is extruded per unit time divided by the circumference of the die exit, provides a commonly used measure of throughput performance, and is expressed in units of PPH/Inch, Pounds Per Hour per Inch of die exit circumference. Many different cooling systems have been developed and employed, both external and internal to the tube, and to varying degrees these systems have achieved commercial success.

Blown film cooling systems provide a flow of cooling gas typically external, but in many cases also internal to the molten film tube. Cooling systems are designed using well known Bernoulli and Coandă principles, and in many cases, apply the cooling gas to flow generally along the surface of the molten film tube to create holding forces on the molten film tube, providing for both stability and cooling of the molten film tube. Excessive holding forces, if present, can cause vibration, flutter, and high noise levels in the process, and can pull the molten film tube into undesirable contact with the cooling element, creating drag and causing marks and instability in the molten film tube. In other cases, cooling gas is instead applied generally against the surface of the molten film tube, typically creating turbulent cooling with repelling forces, requiring a separate means to stabilize the molten film tube.

External cooling systems, generally provide the primary means for stabilization and cooling of the molten film tube, are generally easy to operate and used on most blown film extrusion processes. External cooling systems provide a flow of cooling gas along the outside surface of the molten film tube that typically generates holding forces while cooling the molten film tube, until the cooling gas dissipates into the surrounding atmosphere. Less typically, cooling gas is aimed generally inward generating repelling forces while cooling the molten film tube, undesirably requiring a separate means to hold and stabilize the molten film tube.

Present art external cooling systems are made up of various types of cooling elements. The earliest cooling element, known as a "Single Flow air ring", still in common use today, applies a single flow of cooling gas around the molten film tube. Single Flow cooling elements typically produce good film quality, but at lower throughput rates. Additional flows of cooling gas have been added to cooling elements over time to create various multiple flow designs, such as "Dual Flow", "Triple Flow" or "Quad Flow" designs, and some external cooling systems pair cooling elements into various configurations, depending on the application, to form what is generically known as a "Tandem" air ring. External cooling systems are typically fixed in place, but can be made adjustable in height above the die to allow extending the cooled surface area along the molten film tube, producing higher throughput, but also resulting in greater unsupported surface area between the cooling element and die, which is the hottest and weakest portion of the molten film tube, which can lead to degraded stability, making it more difficult to operate and potentially leading to a narrower range of film sizes.

In contrast, internal cooling systems typically do not provide primary stabilization, and are selectively used typically to generate additional throughput beyond the capability of an external cooling system. Internal cooling systems replace manual gas injection and inflate the molten film tube with a flow of an internal supply gas that enters through the die. Although some recent high throughput internal cooling systems apply cooling gas to create holding forces, more typically cooling gas is directed against the inside surface of the molten film tube, acting to generally repel and cool the inside surface of the molten film tube. The flow of internal supply gas is trapped inside the bubble and cannot dissipate into the atmosphere, therefore complex control systems are used to balance a flow of internal exhaust gas that exits through the die to maintain a constant bubble size as is well known and understood by those skilled in the art. Internal cooling systems can be difficult or even impossible to use depending on such factors as operator skill, thermoplastic material properties, and the physical size and design of the associated die.

It is highly desired to overcome the drawbacks of prior art thermoplastic cooling systems and provide a cooling system that significantly increases throughput rate, maximizes aerodynamic holding forces, allows relatively large unsupported regions of the molten tube with good stability, produces a wide range of film sizes, prevents drag on the molten film surface, minimizes turbulence, vibration and flutter, does not produce high sound power levels, and is simple and easy to control.

SUMMARY OF THE INVENTION

In view of the foregoing, it is an object of the present disclosure to provide a method and apparatus for cooling.

A first exemplary embodiment of the present disclosure presents an apparatus for cooling. The apparatus includes at least one divergent cooling element for receiving a flow of a molten film tube, the at least one divergent cooling element including a divergent cooling interface operable for expelling a cooling gas (i) in a path opposing the flow of the molten film tube toward a first exit gap and (ii) in a path with the flow of the molten film tube toward a second exit gap, wherein at least one of the first exit gap and the second exit gap define a minimum gap between the divergent cooling interface and the flow of the molten film tube.

A second exemplary embodiment includes wherein the divergent cooling interface includes a cooling gas deflector for directing expelled cooling gas along the path opposing the flow of the molten film tube and along the path with the flow of the molten film tube.

A third exemplary embodiment includes wherein a portion of the divergent cooling interface in the path opposing the flow of the molten film tube forms one or more compound angles, and wherein a portion of the divergent cooling interface in the path with the flow of the molten film forms one or more compound angles.

A fourth exemplary embodiment of the present disclosure presents a method for cooling. The method includes receiving, by at least one divergent cooling element, a flow of a molten film tube. The method further includes cooling, by the at least one divergent cooling element, the flow of the molten film tube, wherein the at least one divergent cooling element comprises a divergent cooling interface operable for expelling a cooling gas (i) in a path opposing the flow of the molten film tube toward a first exit gap and (ii) in a path with the flow of the molten film tube toward a second exit gap, wherein at least one of the first exit gap and the second exit gap define a minimum gap between the divergent cooling interface and the flow of the molten film tube.

A fifth exemplary embodiment of the present disclosure presents an apparatus for cooling. The apparatus includes a unidirectional cooling element for receiving a flow of a molten film tube, the unidirectional cooling element comprising a unidirectional cooling interface operable for expelling a cooling gas in a path with the flow of the molten film tube toward an exit gap, wherein the exit gap defines a minimum gap with expelled cooling gas flowing between the unidirectional cooling interface and the flow of the molten film tube.

A sixth exemplary embodiment of the present disclosure presents a method for cooling. The method includes receiving, by a unidirectional cooling element, a flow of a molten film tube, and cooling, by the unidirectional cooling element, the flow of molten film tube, wherein the unidirectional cooling element comprises a unidirectional cooling interface operable for expelling a cooling gas in a path with the flow of the molten film tube toward an exit gap, wherein the exit gap defines a minimum gap with expelled cooling gas flowing between the unidirectional cooling interface and the blow of the molten film tube.

The following will describe embodiments of the present invention, but it should be appreciated that the present invention is not limited to the described embodiments and various modifications of the invention are possible without departing from the basic principles. The scope of the present disclosure is therefore to be determined solely by the appended claims.

BRIEF DESCRIPTION OF THE DRAWINGS

FIG. 5 is a logic flow diagram in accordance with a method and apparatus for performing exemplary embodiments of this disclosure.

FIG. 8 is a logic flow diagram in accordance with a method and apparatus for performing exemplary embodiments of this disclosure.

DETAILED DESCRIPTION OF THE INVENTION

Figure 1:
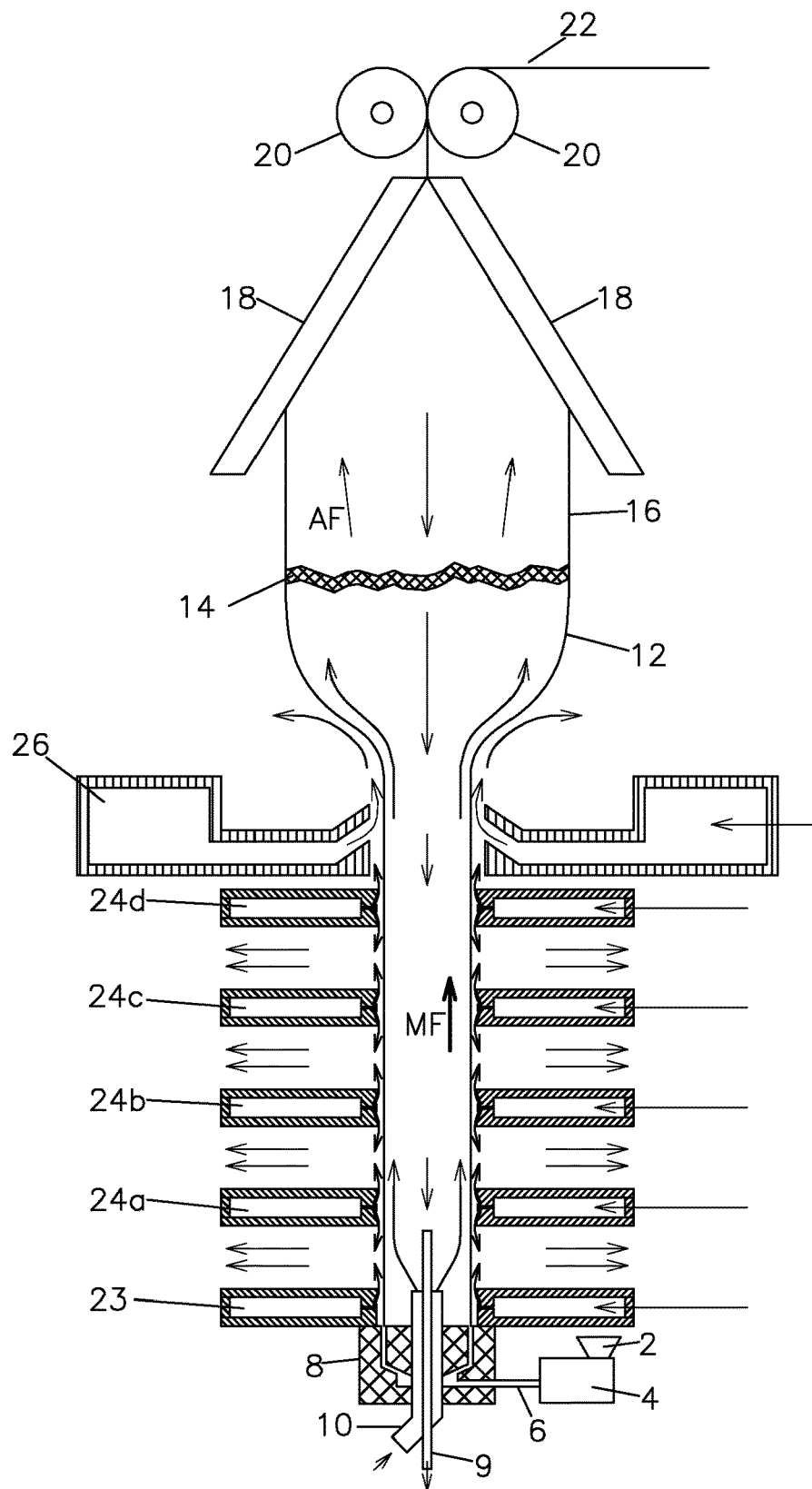
FIG. 1 is a cross sectional view of a device suitable for use in practicing exemplary embodiments of this disclosure.

Exemplary embodiments of the present disclosure relate to a high performance cooling system for the blown film tubular extrusion process providing increased throughput rate at high quality. Embodiments of the high performance cooling system include one or more cooling elements, capable of being stacked to achieve higher throughput, wherein at least one of the one or more cooling elements is a divergent cooling element incorporating a cooling gas deflector and a pair of opposed cooling members having respective opposed air foil surfaces (surfaces). The surfaces and cooling gas deflector form a divergent cooling interface that directs cooling gas to flow in opposite directions, creating suction forces. These suction forces stabilize and hold the molten film tube (melt) in cooling proximity with the divergent cooling element. Oppositely directed cooling gas flows are expelled between the divergent cooling interface and the melt (i) in a path opposing the flow of the molten film tube along a first surface toward a first air foil exit tip to form a first exit gap with the melt and (ii) in a path with the flow of the molten film tube along a second surface toward a second air foil exit tip to form a second exit gap with the melt.

The divergent cooling interface includes air foil exit tips that are angled inward toward the surface of the molten film tube, and extend closer to the molten film tube than any other portion of the divergent cooling element. All portions of the divergent cooling interface are recessed within the air foil exit tips away from the molten film tube, preventing hang-up inducing drag. The angled in air foil exit tips act to compress the cooling gas stream, providing a cushioning effect that dampen vibrations and flutter in the molten film tube, and eliminate excessive sound power levels. Additionally, the angled in air foil exit tips act similar to a venturi, to accelerate the cooling gas streams flowing along the molten film tube to a higher velocity where the cooling gas streams emerge from the influence of associated cooling members at the air foil exit tips and flow along the molten film tube. This higher velocity cooling gas flow translates into higher cooling efficiency and throughput.

Further, one or more compound angles are preferentially employed along the air foil surfaces. Larger surface angles (up to about 45 degrees from parallel to the molten film surface) provide greater compression of the cooling gas, which desirably improves cooling efficiency, but unfortunately, also can cause an undesirable reduction in holding force. Use of compound angles wraps the cooling gas flow smoothly around cooling element air foil surfaces, which are advantageously arranged to change from a larger to a smaller angle relative to the molten film tube, in the direction of cooling gas flow, prior reaching the air foil exit tips. This approach allows larger initial cooling member air foil surface angles which act to aggressively compress the cooling gas streams for maximum cooling efficiency, followed by smaller surface angles, just prior and up to the air foil exit tips, which act to accelerate the cooling gas streams, restoring holding force to a maximum. Divergent cooling elements with compound angles in the cooling member air flow surfaces, exhibit very high cooling efficiency, maximum holding force, and excellent stability, without vibration, flutter or high sound power levels.

Advantageously, a simplified single air delivery channel is provided between first and second cooling members, feeding an inward radial flow of cooling gas arranged to impinge on an outer wall of a cooling gas deflector, preventing direct cooling gas flow against the blown film tube and separating the flow into oppositely directed first and second annular cooling gas streams. The cooling gas deflector generally arranged intermediate between the cooling members and the molten tube such that the inner wall of the cooling gas deflector is spaced further from the molten tube than the associated cooling member tips to prevent drag. Additional flows of cooling gas can be advantageously added, but are not required.

Embodiments of a divergent flow, high performance cooling element of the present invention include a simplified air delivery channel feeding one or more compound angle cooling member air foil surface with an initial 22.5 degree angle followed by a 7.5 degree air foil exit tip angle, provide an increased holding force, reduced vibration and flutter resulting in measured sound power levers 18 db lower (64 times less) than divergent cooling elements with a 0 degree air foil exit tip angle. Embodiments of the present disclosure include one or more compound angle cooling member air foil surface with an initial angle between 15 and 25 degrees, followed by an exit tip angle between 5 and 15 degrees with excellent stability, efficiency gains, increased holding force, reduced vibration and flutter. However, it should be appreciated that embodiments include a cooling gas foil surface and an exit tip angle with any combination of compound angles that aid in increasing throughput, stability, and in reducing vibration and flutter.

FIG. 1 shows a cross sectional view of a typical blown film extrusion process employing a short stack cooling system with divergent cooling elements of the present invention. In FIG. 1-FIG. 4, and FIGS. 6-7, all thin arrows indicating a direction are for illustrative purposes only, labeled for example as AF, and indicate a direction flow of a fluid (e.g. cooling gas). Further, Thick arrows indicating a direction are for illustrative purposes only, labeled for example as MF, and indicate a direction flow of a plastic film material (e.g. molten film tube). Thermoplastic resin is introduced through feed hopper 2 into extruder 4 where the resin is melted, mixed and pressurized. Molten resin is conveyed through melt pipe 6 into a die means 8 that forms it into an annular molten flow that exits generally from the top surface of die means 8 as a molten film tube 12.

Internal gas supply conduit 10 operably provides an internal cooling/inflating gas through die means 8 to the interior of molten film tube 12 and solidified film tube 16. Internal gas exhaust conduit 9 operably removes internal cooling/inflating gas through die means 8 as required to maintain a desired trapped tube volume of gas inside molten film tube 12 and solidified film tube 16, further contained by nip rollers 20. Gas flow through Internal gas supply conduit 10 and Internal gas exhaust conduit 9 are controlled by methods commonly understood by those skilled in the art. Molten film tube 12 expands outwardly around the trapped tube volume of gas and is drawn upwardly by nip rollers 20 while being cooled to solidify at freeze line 14 forming solidified film tube 16. Solidified film tube 16 is collapsed by flattening guides 18 before passing through nip rollers 20 forming flattened film 22. Flattened film 22 is then conveyed to downstream equipment for conversion into usable products as desired.

Annular cooling elements 23, 24a-d, and 26 are arranged coaxial with and in the direction of flow of molten film tube 12. Cooling elements 23, 24a-d, and 26, each supplied with cooling gas from a suitable external source, direct associated cooling gas alongside molten film tube 12, generally in the same and/or opposite direction to the flow of molten film tube 12, acting to stabilize and cool molten film tube 12.

Upward cooling gas traveling generally in the direction of flow of molten film tube 12 from cooling elements 23 and 24a-c, and downward cooling gas traveling generally opposite the direction of flow of molten film tube 12 from cooling elements 24a-d flows alongside and cools molten film tube 12, and exhausts between cooling elements 23 and 24a-d to the surrounding atmosphere. Generally upwardly directed cooling gas from cooling element 26 flows unrestricted, along molten film tube 12, directly influenced by the surrounding atmosphere, while cooling and allowing for free expansion of molten film tube 12.

Figure 2:
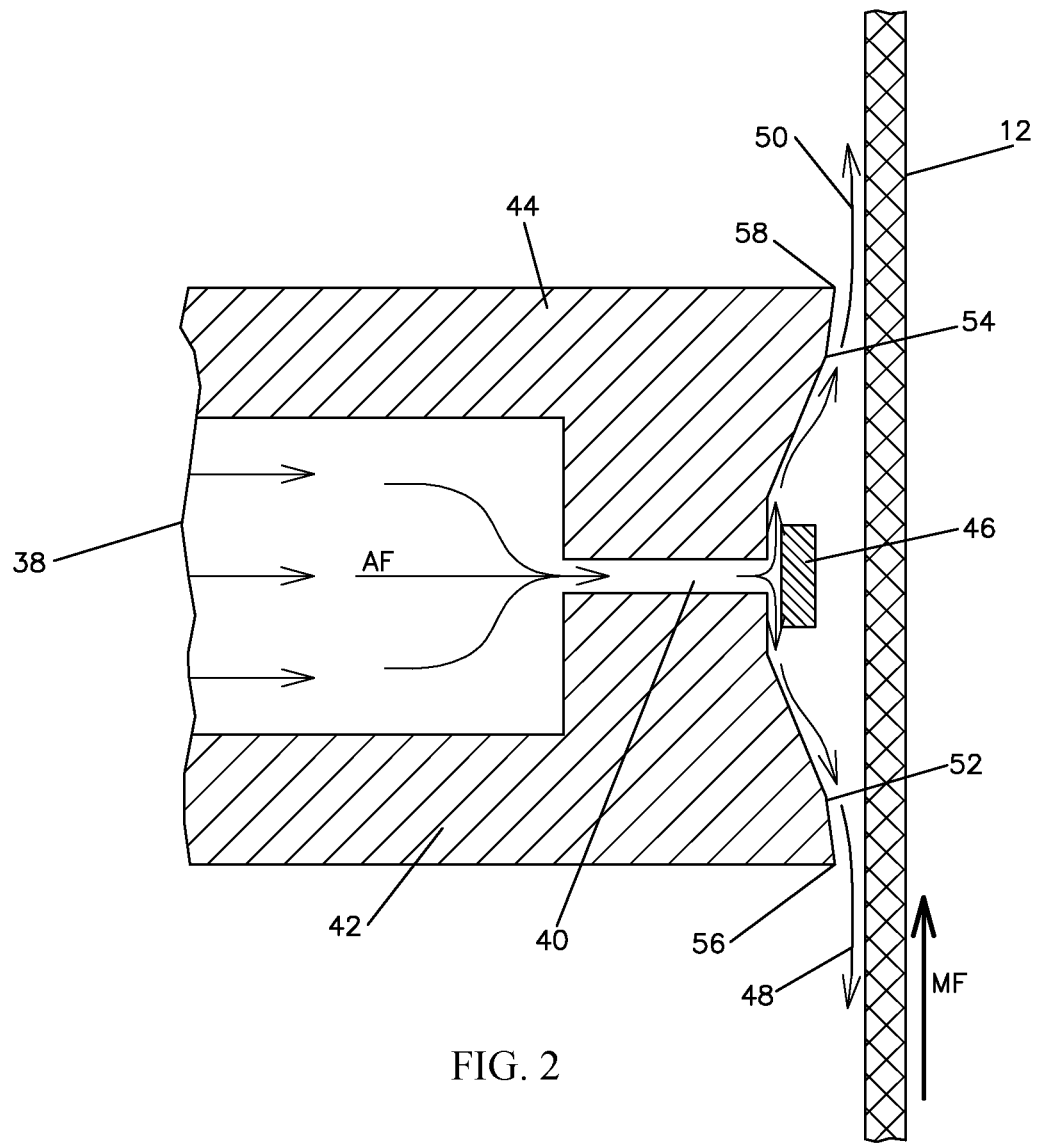
FIG. 2 is a close-up cross sectional view of an exemplary cooling element suitable for use in practicing exemplary embodiments of this disclosure.

FIG. 2 shows a cross sectional view of the inner portion of one half of a divergent cooling element, of the present invention. Each divergent cooling element (FIG. 1, 24a-d) is provided with an interior air plenum 38 of any suitable shape and size, that directs the associated supplied cooling gas to flow generally radially inward through annular channel 40 formed between cooling members 42 and 44. Annular channel 40 feeds cooling gas toward cooling gas deflector 46, inwardly supported from cooling members 42 and/or 44 using common, readily available fastening means such as screws and washers, not shown. Cooling gas deflector 46 prevents direct cooling gas flow against molten film tube 12 and separates cooling gas flow into oppositely directed cooling gas streams 48 and 50. Cooling gas stream 48 flows generally opposite the direction of the flow of molten film tube 12, between air foil surface 52 and molten film tube 12. Cooling gas stream 50 flows generally in the same direction of flow of molten film tube 12, between air foil surface 54 and molten film tube 12.

Air foil surfaces 52 and 54 are annularly angled inward toward molten film tube 12, in the direction of respective air flow just prior to terminating at air foil exit tips 56 and 58, where cooling gas streams 48 and 50 leave the influence of air foil surfaces 52 and 54 respectively and flow in cooling contact along the surface of molten film tube 12. Compound angles are preferentially employed along air foil surfaces 52 and 54 with larger angles relative to molten film tube 12 located nearest to cooling gas deflector 46, and smaller angles located adjacent respective air foil exit tips 56 and 58. Importantly, no portion of the divergent cooling element having a divergent cooling interface comprised of cooling gas deflector 46, air foil surfaces 52 and 54, and air foil exit tips 56 and 58 is closer to the molten film tube than either one or both of the air foil exit tips 56 and 58, to ensure that no mechanical contact with molten film tube 12 can occur.

Figure 3:
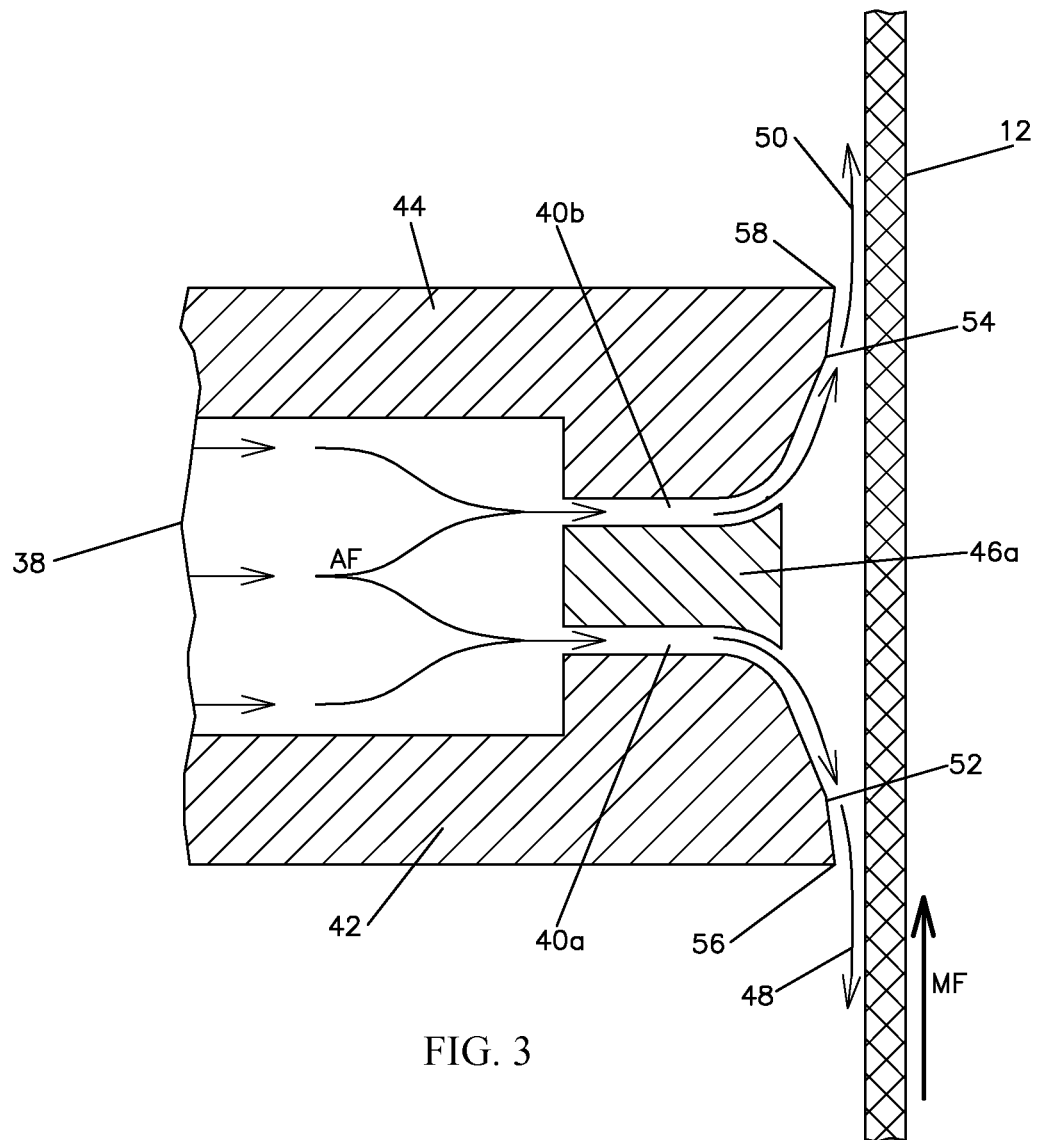
FIG. 3 is a close-up cross sectional view of an alternative exemplary cooling element suitable for use in practicing exemplary embodiments of this disclosure.

In FIG. 3, cooling gas deflector 46 is replaced by cooling gas deflector 46a located intermediate cooling members 42 and 44, forming a pair of annular channels 40a and 40b. Cooling gas from interior air plenum 38 generally flows radially inward, independently through annular channels 40a and 40b, exiting the influence of cooling gas deflector 46a as oppositely directed cooling gas streams 48 and 50, respectively. Cooling gas stream 48 flows generally opposite the direction of flow of molten film tube 12, between air foil surface 52 and molten film tube 12. Cooling gas stream 50 flows generally in the same direction of flow of molten film tube 12, between air foil surface 54 and molten film tube 12.

As described in FIG. 2, air foil surfaces 52 and 54 are annularly angled inward toward molten film tube 12, in the direction of respective air flow just prior to terminating at air foil exit tips 56 and 58, where cooling gas streams 48 and 50 leave the influence of air foil surfaces 52 and 54 respectively and flow in cooling contact along the surface of molten film tube 12. Compound angles are preferentially employed along air foil surfaces 52 and 54 with larger angles relative to molten film tube 12 located nearest to cooling gas deflector 46a, and smaller angles located adjacent respective air foil exit tips 56 and 58. Importantly, no portion of the divergent cooling element having a divergent cooling interface comprised of cooling gas deflector 46a, air foil surfaces 52 and 54, and air foil exit tips 56 and 58 is closer to the molten film tube than either one or both of the air foil exit tips 56 and 58, to ensure that no mechanical contact with molten film tube 12 can occur.

Figure 4:
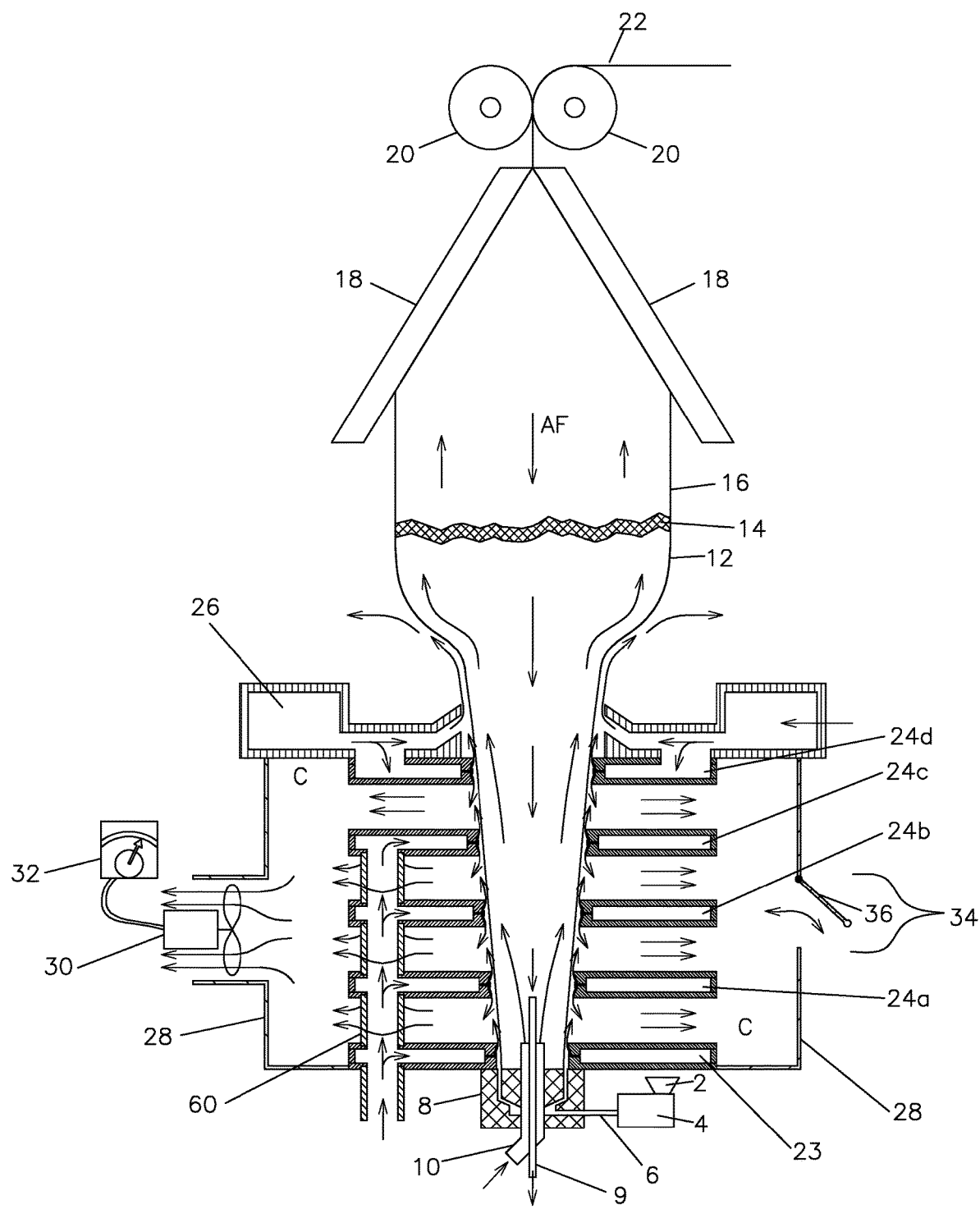
FIG. 4 is a cross sectional view of an alternative device suitable for use in practicing exemplary embodiments of this disclosure.

FIG. 4 depicts a cooling system employing high performance, divergent cooling elements of the present invention in a configuration similar to FIG. 1, but with the addition of a enclosure 28, variable exhaust device 30, variable controller means 32, and flow buffer 34 with freely swinging flapper 36 as described in co-pending application titled Controlled Pressure Enclosure filed on Jan. 15, 2016 with first named inventor Robert E. Cree, the contents of which is hereby incorporated by reference. Cooling gas supply conduits 60 are also added, spaced generally inside and around the perimeter of cooling elements 23, 24a, 24b and 24c, forming a common supply of cooling gas. Cooling gas supply conduits 60 also act to space apart and locate concentric to molten film tube 12 each of the associated cooling elements 23, 24a, 24b and 24c. Cooling element 24d is advantageously shown supplied with cooling gas in common with cooling element 26, forming a high performance triple flow air ring. Cooling element 26 is depicted with one single-flow of cooling gas, but can include more than one flow of cooling gas, forming further high performance multiple-flow versions in combination with cooling element 24d of the present invention, exiting to flow unrestricted, generally upward and along molten film tube 12, directly influenced by the surrounding atmosphere, while cooling and allowing for free expansion of molten film tube 12. Cooling element 26 may also be omitted, allowing cooling gas exiting from the upper most located high performance, divergent cooling element to either be located below frost line 14 and allow for free expansion or be located above frost line 14 and constrain the molten film tube 12.

The present invention is presented on an upward blown film extrusion process, but equally applies to horizontal or downward versions of the blown film extrusion process, without limit. Further, the present invention can be employed in a linear rather than annular configuration, and applies to collapsing frame stabilization as well as single sheet cast film prior art.

Referring to FIG. 5, presented is an exemplary logic flow diagram in accordance with a method and apparatus for performing exemplary embodiments of this disclosure. Block 502 presents receiving, by at least one divergent cooling element, a flow of a molten film tube; and cooling, by the at least one divergent cooling element, the flow of the molten film tube, wherein the at least one divergent cooling element comprises a divergent cooling interface operable for expelling a cooling gas (i) in a path opposing the flow of the molten film tube toward a first exit gap and (ii) in a path with the flow of the molten film tube toward a second exit gap, wherein at least one of the first exit gap and the second exit gap define a minimum gap between the divergent cooling interface and the flow of the molten film tube. Block 504 relates to wherein the at least one divergent cooling interface comprises a cooling gas deflector for directing expelled cooling gas along the path opposing the flow of the molten film tube and along the path with the flow of the molten film tube.

Then block 506 indicates further comprising cooling by a second cooling element stacked adjacent the at least one divergent cooling element. Block 508 specifies further comprising cooling the flow of the molten film tube by at least one of a triple flow air ring and a multiple flow air ring. Block 510 then indicates wherein a space is defined between the at least one divergent cooling element and the second cooling element to allow gas exchange with a surrounding atmosphere. Block 512 then states wherein a portion of the divergent cooling interface expelling the cooling gas in the path opposing the flow of the molten film tube forms compound angles, and wherein a portion of the divergent cooling interface expelling the cooling gas in the path with the flow of the molten film forms compound angles.

Block 514 relates to wherein the expelled cooling gas from the at least one divergent cooling element sufficiently cools the molten film tube at a rate between 0.5 and 5 (pounds/hour)/(inch of die circumference). Finally block 516 then states wherein at least a portion of the cooling gas is received by at least one enclosure comprising a cavity for receiving the cooling gas from the at least one divergent cooling element, the at least one enclosure operable to maintain a predetermined pressure differential between an inside surface and an outside surface of the flow of the molten film tube.

The logic flow diagram may be considered to illustrate the operation of a method. The logic flow diagram may also be considered a specific manner in which components of a device are configured to cause that device to operate, whether such a device is a blown film tubular extrusion device, controlled pressure enclosure, or divergent cooling element, or one or more components thereof.

In an alternative exemplary embodiment, the apparatus includes a unidirectional cooling element having a unidirectional cooling interface containing a cooling gas deflector spaced adjacent to the molten film tube operable to expel a cooling gas only in a path with the flow of the molten film tube. The cooling gas is expelled between the unidirectional cooling interface and the molten film tube toward an exit gap. The molten film tube exits the die lip adjacent the unidirectional cooling element, allowing resultant vacuum forces created by the expelled cooling gas to pull the molten film tube toward the unidirectional cooling interface, causing a minimum gap between the unidirectional cooling interface and the molten film tube to occur at the exit gap.

Advantageously, the unidirectional cooling interface is provided with one or more compound angles to maximize the stability of the molten film tube and cooling efficiency. An additional cooling element (e.g., single flow, dual flow, dual flow air foil, or multiple flow) can be placed adjacent to the unidirectional cooling element, in the direction of the flow of the molten film tube. The additional cooling element can also include a dual flow air ring air foil. However, in this embodiment the first flow of air is replaced by a flow of cooling gas exiting from the adjacent unidirectional cooling element. Operation is characterized by improved output rate of blown molten film, improved film holding forces to maintain the stability of the molten film tube, and easier adjustment to optimize performance of molten film output rates, without the presence of high noise levels or detrimental vibration of the molten film tube, flutter of the molten film tube, and drag.

Figure 6:
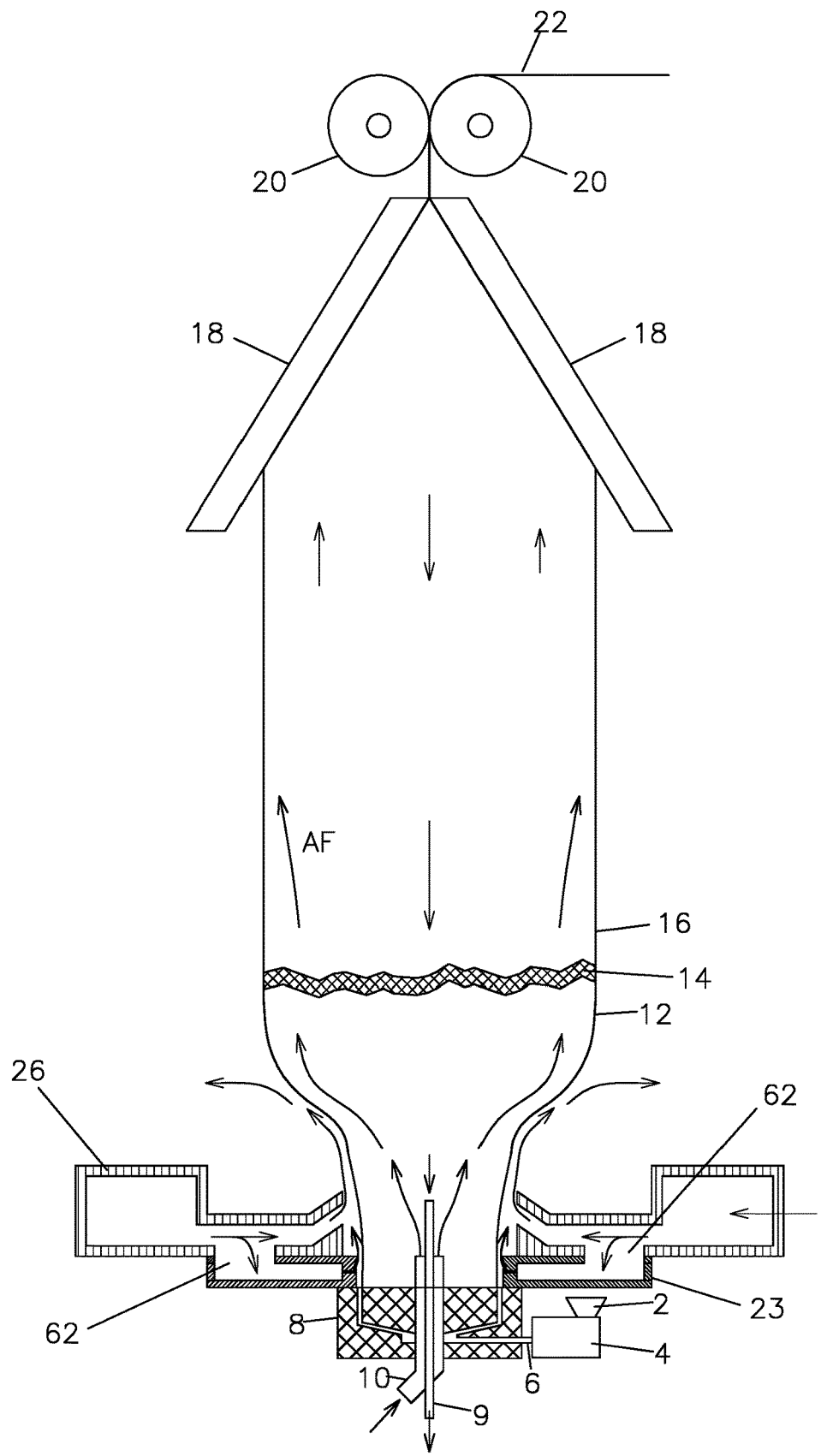
FIG. 6 is a cross sectional view of an alternative device suitable for use in practicing exemplary embodiments of this disclosure.

Referring to FIG. 6, shown is a cross sectional view of a typical blown film extrusion process employing a cooling system employing an annular cooling element 23 (also known as a unidirectional cooling element), arranged coaxial with and in the direction of flow of molten film tube 12 adjacent the top surface of die means 8. Cooling element 26 is arranged coaxial with and in the direction of flow of molten film tube 12 adjacent the top surface of cooling element 23. Cooling elements 23 and 26 are shown with connecting passages 62 that allow for a common supply of cooling gas from a suitable external source, however, cooling elements 23 and 26 can also be independently supplied with cooling gas from an external source. Cooling elements 23 and 26, direct cooling gas alongside molten film tube 12, generally in the same direction as the flow of molten film tube 12, stabilizing and cooling molten film tube 12.

Figure 7:
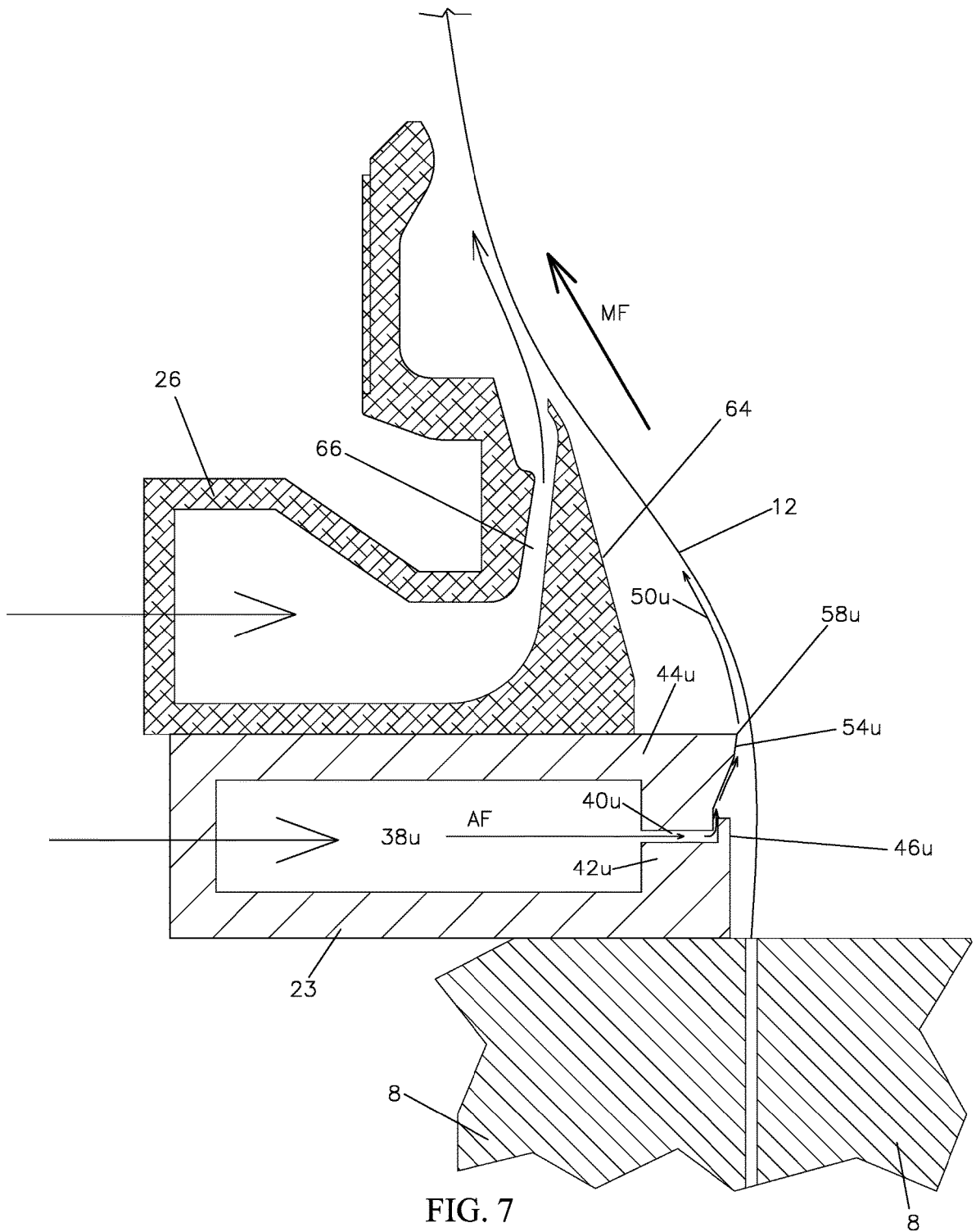
FIG. 7 is a close-up cross sectional view of an alternative exemplary cooling element suitable for use in practicing exemplary embodiments of this disclosure.

FIG. 7 shows a close-up cross sectional view of the inner portion of one half of a unidirectional cooling element operable to expel cooling gas. In FIG. 7, cooling elements 23 and 26 are shown having independent cooling gas supplies from a suitable external source, however, it should be appreciated that embodiments of cooling elements 23 and 26 can be supplied from a common supply of cooling gas (shown in FIG. 6). As depicted, cooling element 26 is stacked on top of cooling element 23 such that cooling element 26 is in contact with cooling element 23 thereby substantially preventing gas exchange with the surrounding atmosphere between cooling element 26 and cooling element 23. Cooling element 23 is provided with an interior air plenum 38$u$ of any suitable shape and size, that directs the associated supplied cooling gas to flow generally radially inward through annular channel 40$u$ formed between cooling members 42$u$ and 44$u$. Annular channel 40$u$ feeds cooling gas toward cooling gas deflector 46$u$, formed as an extension of cooling member 42$u$. Cooling gas deflector 46$u$ prevents direct cooling gas flow against molten film tube 12 and directs cooling gas stream 50$u$ to flow generally in the same direction of flow of molten film tube 12, between air foil surface 54$u$ and molten film tube 12. Cooling gas deflector 46$u$ as depicted, is rectangular shaped, however, it should be appreciated that embodiments of cooling gas deflector 46$u$ includes any shape (e.g., triangular or curved) that operably redirects cooling gas toward air foil surface 54$u$ in the path of the flow of molten film tube 12.

Air foil surface 54$u$ is annularly angled inward toward molten film tube 12, in the direction of cooling gas flow just prior to terminating at air foil exit tip 58$u$, where the cooling gas stream 50$u$ leaves the influence of air foil surface 54$u$ and continues to flow in cooling contact along the surface of molten film tube 12. As shown in FIG. 7, compound angles are employed along air foil surface 54$u$ with larger angles relative to molten film tube 12 located nearest to cooling gas deflector 46$u$, and smaller angles located adjacent respective air foil exit tip 58$u$. It should be appreciated that embodiments of air foil surface 54$u$ need not include compound angles, but can include an angled or curved surface relative to molten film tube 12 provided that a minimum gap between air foil surface 54$u$ and the surface of molten film tube 12 is located at air foil exit tip 58$u$. No portion of cooling element 23 having a unidirectional cooling interface comprised of cooling gas deflector 46$u$, air foil surface 54$u$, and air foil exit tip 58$u$ is closer to the molten film tube than air foil exit tip 58$u$. To ensure that no mechanical contact with molten film tube 12 can occur, it is important to arrange all portions of cooling gas deflector 46$u$, radially spaced outwardly from the exit point of die means 8, where the annular molten flow exiting die means 8 forms molten film tube 12.

Cooling element 26 is a single flow air ring that directs cooling gas toward the outside surface of molten film tube 12 in the path of the flow of molten film tube 12. In practice, the molten film tube 12 is extruded from die means 8 (e.g., a spiral distribution extrusion die), and received by unidirectional cooling element 23. Unidirectional cooling element 23 expels cooling gas deflected by cooling gas deflector 46$u$ in the path of the flow of the molten film tube 12. The cooling gas exiting from the influence of cooling gas deflector 46$u$, and flowing between air foil surface 54$u$ and molten film tube 12 flows towards air foil exit tip 58$u$ where the cooling gas exits from cooling element 23 towards cooling element 26. Cooling element 26 receives the expelled cooling gas from cooling element 23 at its cooling interface 64, and also expels cooling gas in the path of the flow of the molten film tube 12 from annular channel 66. FIG. 7 depicts cooling element 26 with a cooling interface 64 in the shape and form of a dual flow air ring with the first annular gap removed and replaced by cooling element 23. It should be appreciated that cooling element 26 can be any suitable shape and form, including employing more than one flow of cooling gas, as long as cooling element 23 is arranged to receive the flow of molten film tube 12 prior to cooling element 26. Cooling elements 23 and 26, direct associated cooling gas circumferentially along the outside surface of molten film tube 12, generally in the same direction to the flow of molten film tube 12, acting to stabilize and cool molten film tube 12. Molten film tube 12 is cooled by the cooling gas expelled from cooling elements 23 and 26 such that at some given distance above cooling element 26, molten film tube 12 solidifies at freeze line 14 forming solidified film tube 16. Embodiments of cooling elements 23 and 26 expel cooling gas and create a vacuum between molten film tube 12 and their cooling interface such that molten film tube 12 is pulled or urged radially outward toward the cooling elements interface. Embodiments of cooling element 23 provide a means to cool molten film tube 12 such that molten film tube 12 is cooled at a rate between 0.5 and 5 (pounds/hour)/(inch of die circumference) in addition to the cooling rate of cooling element 26. Embodiments of cooling elements 23 and 26 are operable to expel cooling gas at a rate between 2,000 to 20,000 feet/minute. Embodiments of the cooling element 23 provide a cooling interface wherein the expelled cooling gas is expelled such that during operation the cooling interface is covered or lubricated by expelled cooling gas. In other words, the cooling interface of cooling element 23 provides an air foil exit tip 58$u$ that is the closest portion of cooling element 23 to the surface of molten film tube 12, with expelled cooling gas flowing between the air foil exit tip 58*u* and molten film tube 12 and no portion of cooling element 23 is in direct contact with molten film tube 12.

Referring to FIG. 8, presented is an exemplary logic flow diagram in accordance with an alternative method and apparatus for performing exemplary embodiments of this disclosure. Block 802 provides (a) receiving, by a unidirectional cooling element, a flow of a molten film tube; and (b) cooling, by the unidirectional cooling element, the flow of molten film tube, wherein the unidirectional cooling element comprises a unidirectional cooling interface operable for expelling a cooling gas in a path with the flow of the molten film tube toward an exit gap, wherein the exit gap defines a minimum gap with expelled cooling gas flowing between the unidirectional cooling interface and the blow of the molten film tube. Then block 804 presents wherein the unidirectional cooling interface comprises a cooling gas deflector for directing expelled cooling gas along the path with the flow of the molten film tube.

Following block 804, block 806 specifies the method further comprising cooling by a second cooling element stacked adjacent the unidirectional cooling element. Block 808 relates to the method further comprising cooling the flow of the molten film tube by at least one of a single flow air ring, a dual flow air ring, a triple flow air ring, and a multiple flow air ring. Block 810 specifies the method further comprising cooling the flow of the molten film tube by the second cooling element comprising a single flow air foil having a cooling interface operable to expel cooling gas in the path with the flow of the molten film tube, and receive expelled cooling gas from the unidirectional cooling element along the cooling interface. Block 812 states wherein the single flow air flow foil is a dual flow air foil with a first annular gap removed. Block 814 then states wherein a portion of the unidirectional cooling interface expelling the cooling gas in the path with the flow of the molten film form compound angles. Then block 816 indicates wherein the expelled cooling gas from the unidirectional cooling element sufficiently cools the molten film tube at a rate between 0.5 and 5 (pounds/hour)/(inch of die circumference). Finally block 818 states wherein the unidirectional cooling element is operable to expel cooling gas at a rate of between 2,000 to 20,000 feet/minute.

The logic flow diagram shown in FIG. 8 may be considered to illustrate the operation of a method. The logic flow diagram may also be considered a specific manner in which components of a device are configured to cause that device to operate, whether such a device is a blown film tubular extrusion device, controlled pressure enclosure, or unidirectional cooling element, or one or more components thereof.

Figure 9:
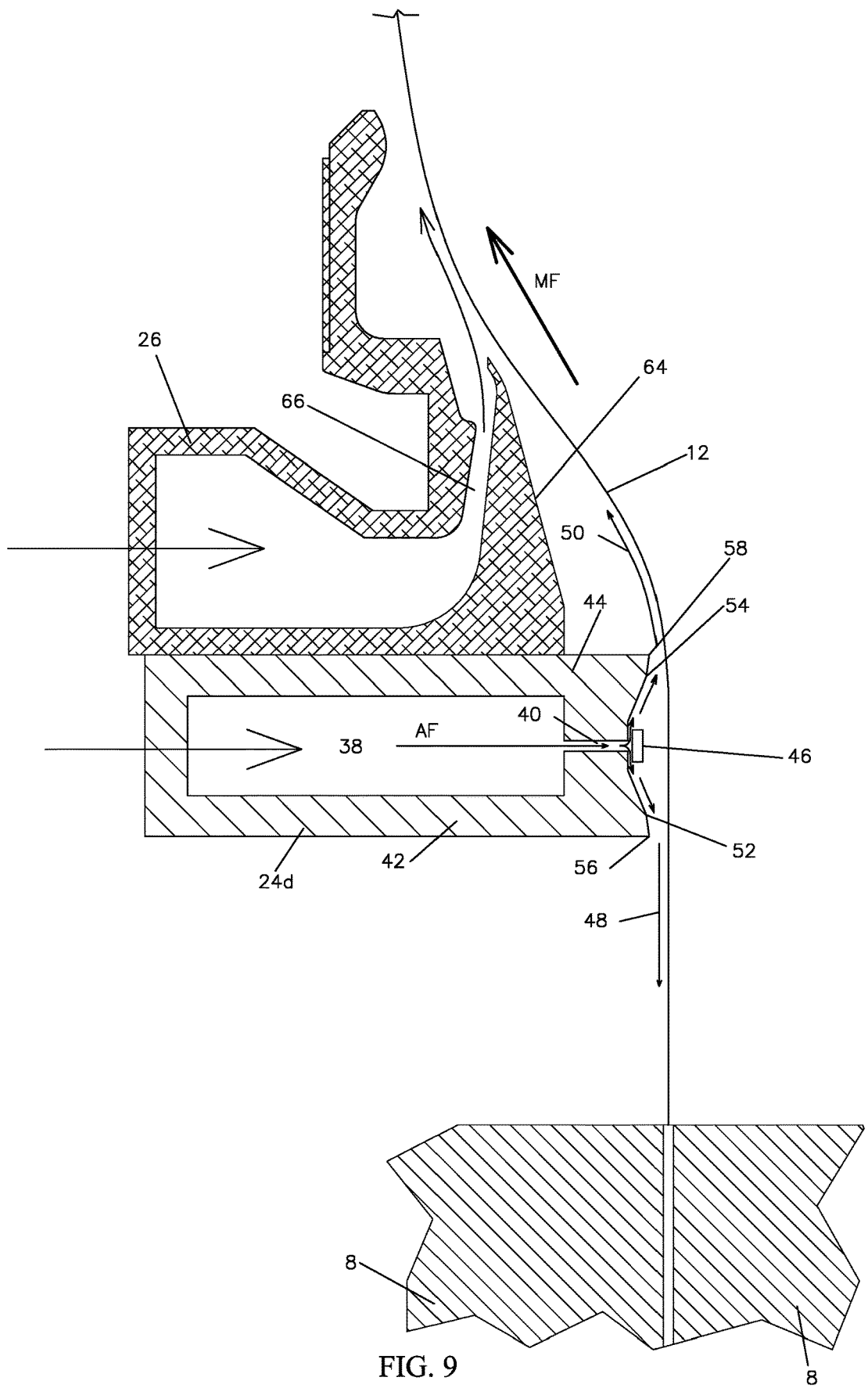
FIG. 9 is a close-up cross sectional view of an alternative exemplary cooling element suitable for use in practicing exemplary embodiments of this disclosure.

FIG. 9 depicts a cooling system employing a high performance, divergent cooling element of the present invention in a configuration similar to FIG. 7, but with cooling element 23 replaced by cooling element 24*d* operating as a divergent cooling element as described in FIGS. 2 and 3. Cooling element 26 is depicted with one single-flow of cooling gas, but can include more than one flow of cooling gas, forming further high performance multiple-flow versions in combination with cooling element 24*d* of the present invention, exiting to flow unrestricted, generally upward and along molten film tube 12, directly influenced by the surrounding atmosphere, while cooling and allowing for free expansion of molten film tube 12. Cooling element 24*d* and cooling element 26 as depicted, form a high performance triple flow air ring, spaced apart from and coaxial with die means 8, in the direction of flow of molten film tube 12, and provide enhanced stability and output rate.

The spaced apart distance between cooling element 24*d* and die means 8, can be fixed or adjustable, acting to cool and support the molten film tube 12 at locations from just above die means 8 up to several feet above die means 8.

Embodiments of the present invention has been described in detail with particular reference to particular embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An apparatus for cooling, the apparatus comprising:
 a unidirectional cooling element for receiving a flow of a molten film tube, the unidirectional cooling element comprising a unidirectional cooling interface having a cooling gas deflector operable for expelling a cooling gas in a path with the flow of the molten film tube toward an exit gap, the exit gap is defined by the flow of the molten film tube and an exit tip of the unidirectional cooling interface, wherein the exit gap defines a minimum gap with expelled cooling gas flowing between the unidirectional cooling interface including the cooling gas deflector and the flow of the molten film tube.

2. The apparatus according to claim 1, the apparatus further comprising a second cooling element operably stacked adjacent the unidirectional cooling element.

3. The apparatus according to claim 2, wherein the unidirectional cooling element is in contact with the second cooling element substantially preventing gas exchange with the surrounding atmosphere between the unidirectional cooling element and the second cooling element.

4. The apparatus according to claim 2, wherein a space is defined between the second cooling element and the unidirectional cooling element to allow gas exchange with a surrounding atmosphere.

5. The apparatus according to claim 2, the apparatus further comprising at least one of single flow air ring, a dual flow air ring, a triple flow air ring, and a multiple flow air ring.

6. The apparatus according to claim 1, wherein a portion of the unidirectional cooling interface expelling the cooling gas in the path with the flow of the molten film forms compound angles.

7. The apparatus according to claim 1, wherein the expelled cooling gas from the unidirectional cooling element sufficiently cools the molten film at a rate between 0.5 and 5 (pounds/hour)/(inch of die circumference).

8. The apparatus according to claim 2, wherein the second cooling element comprises a single flow air foil having a cooling interface operable to expel cooling gas in the path with the flow of the molten film tube, and receive expelled cooling gas from the unidirectional cooling element along the cooling interface.

9. The apparatus according to claim 8, wherein the single flow air flow foil is a dual flow air foil with a first annular gap removed.

10. The apparatus according to claim 1, wherein the unidirectional cooling element is operable to expel cooling gas at a rate of between 2,000 to 20,000 feet/minute.

11. A method for cooling, the method comprising:
 (a) receiving, by a unidirectional cooling element, a flow of a molten film tube; and (b) cooling, by the unidirectional cooling element, the flow of molten film tube, wherein the unidirectional cooling element comprises a unidirectional cooling interface having a cooling gas deflector operable for expelling a cooling gas in a path with the flow of the molten film tube toward an exit gap, the exit gap is defined by the flow of the molten film tube and an exit tip of the unidirectional cooling interface, wherein the exit gap defines a minimum gap with expelled cooling gas flowing between the unidirectional cooling interface including the cooling gas deflector and the blow of the molten film tube.

12. The method according to claim 11, the method further comprising cooling by a second cooling element stacked adjacent the unidirectional cooling element.

13. The method according to claim 12, wherein the unidirectional cooling element is in contact with the second cooling element substantially preventing gas exchange with the surrounding atmosphere between the unidirectional cooling element and the second cooling element.

14. The method according to claim 11, the method further comprising cooling the flow of the molten film tube by at least one of a single flow air ring, a dual flow air ring, a triple flow air ring, and a multiple flow air ring.

15. The method according to claim 11, the method further comprising cooling the flow of the molten film tube by the second cooling element comprising a single flow air foil having a cooling interface operable to expel cooling gas in the path with the flow of the molten film tube, and receive expelled cooling gas from the unidirectional cooling element along the cooling interface.

16. The method according to claim 15, wherein the single flow air flow foil is a dual flow air foil with a first annular gap removed.

17. The method according to claim 11, wherein a portion of the unidirectional cooling interface expelling the cooling gas in the path with the flow of the molten film form compound angles.

18. The method according to claim 11, wherein the expelled cooling gas from the unidirectional cooling element sufficiently cools the molten film tube at a rate between 0.5 and 5 (pounds/hour)/(inch of die circumference).

19. The method according to claim 11, wherein the unidirectional cooling element is operable to expel cooling gas at a rate of between 2,000 to 20,000 feet/minute.

* * * * *